United States Patent [19]

Pfeffer

[11] Patent Number: 5,630,856

[45] Date of Patent: *May 20, 1997

[54] SELF-SUPPORTING FILTER COMPOSITE

[75] Inventor: Jack R. Pfeffer, Eagle, Id.

[73] Assignee: UPF Corporation, Bakersfield, Calif.

[*] Notice: The term of this patent shall not extend beyond the expiration date of Pat. No. 5,472,467.

[21] Appl. No.: 536,974

[22] Filed: Sep. 29, 1995

Related U.S. Application Data

[63] Continuation-in-part of Ser. No. 209,920, Mar. 14, 1994, Pat. No. 5,472,467.

[51] Int. Cl.$^6$ ............................................. B01D 50/00
[52] U.S. Cl. ..................... 55/488; 55/527; 55/DIG. 44; 65/454; 65/462; 156/72; 428/85; 428/95; 428/220; 428/284; 428/285; 428/287; 428/297; 428/298
[58] Field of Search ................... 55/488, 527, DIG. 44; 65/454, 462; 156/72; 428/85, 95, 220, 284, 285, 287, 297, 298

[56] References Cited

U.S. PATENT DOCUMENTS

| | | |
|---|---|---|
| 2,728,699 | 12/1955 | Labino . |
| 2,961,698 | 11/1960 | Rea . |
| 3,262,578 | 7/1966 | Dennis . |
| 3,690,852 | 9/1972 | Smith et al. . |
| 4,201,247 | 5/1980 | Shannon . |
| 4,463,048 | 7/1984 | Dickson et al. . |
| 5,472,467 | 12/1995 | Pfeffer ................................ 428/285 |

*Primary Examiner*—James J. Bell
*Attorney, Agent, or Firm*—William W. Haefliger

[57] ABSTRACT

A filter composite comprising a first layer of glass fibers having random orientation, the layer being porous to gas flow therethrough; a porous mat of sufficient stiffness as to support the glass fiber layer during use as a filter, the mat consisting of compacted glass fibers, and; an additional porous layer carried by the mat to block escape of glass fibers or particles from the filter composite during gas flow therethrough. The first layer fibers have diameters between about 0.000035 and 0.00015 inch.

33 Claims, 2 Drawing Sheets

SELF-SUPPORTING FILTER COMPOSITE

BACKGROUND OF THE INVENTION

This application is a continuation-in-part of prior U.S. application Ser. No. 08/209,920 filed Mar. 14, 1994, now U.S. Pat. No. 5,474,467.

This invention relates generally to forming of fiber composites, for example as are used in high-efficiency air filtration; and more particularly, the invention concerns provision of a filter composite comprising multiple layers of porous material, of such characteristics as enable the composite to be self-supporting, i.e., without need for wire backing or other auxiliary support adjacent areal extents of the composite. Such wireless composites are of great advantage, as respects ease of manufacture, use in filtering, and ease of disposal. Wire-supported filters require wire trimming, producing sharp edges which can and do injure hands of workers manufacturing filters.

There is need for longer-life filters capable of efficiently filtering particulate from gas streams, and there is need for efficient, effective methods of producing such filters. There is also need for preventing escape of smaller diameter glass fibers from filter structures. The disclosure of U.S. Pat. No. 3,690,852, incorporated herein by reference, concerns production of a filter comprising two layers of fibers of different sizes. The present invention improves upon the methods described in that patent, as will be seen.

The present invention also improves upon apparatus disclosed in that patent in that it provides for a self-supporting, multi-layer composite requiring no wire backing, as referred to above.

There is also need for improved filters capable of removing up to 95% of particulate of 1 micron size, and characterized by very low back pressure presentation to gas flow.

SUMMARY OF THE INVENTION

It is a major object of the invention to provide an improved filter composite meeting the above needs. That composite basically comprises:

a) a first layer of glass fibers having random orientation, the layer being porous to gas flow therethrough, the first layer fibers having diameters between about 0.000035 and 0.00015 inch, b) and a porous, non-woven, glass mat of sufficient stiffness as to support the glass fiber layer during use as a filter, the mat consisting of compacted glass fibers, An additional porous layer may be carried by the mat to block escape of glass fibers or particles from the filter composite during gas flow therethrough. The first and additional layers may be adhered to opposite sides of the mat.

As will be seen, the filter may be supported in a gas flow duct with the first layer of glass fibers presented toward the oncoming flow, the filter composite in that environment being free of wire support adjacent the area of the composite within the duct. In addition, the first layer of glass fibers is preferably randomly tufted to provide extended surface area for collection of particulate in the gas flow; further, the first layer has fiber density characterized in that at least about 95% of all particulate of one micron size in said flow is collected.

Another object of the invention is to provide the porous mat with sufficient thickness in relation to its overall area as to be resiliently and yieldably bendable during gas flow impingement on the composite. Such bending of the mat results in bending of the first layer of glass fibers, reducing surface build-up of particulate on the first layer. Typically, the mat has thickness substantially less than the overall thickness of the first layer of glass fibers. In this regard, the mat typically consists essentially of non-woven glass fibers, which are compacted and which adhere to one another.

A further object is to provide the additional porous layer, which blocks escape of glass fibers, to consist essentially of non-woven, synthetic fiber, one example being CEREX, an air laid, NYLON, non-woven layer. That additional layer is substantially thinner than the mat and is typically bonded to the mat during the mat manufacturing process.

Another object is to provide a method of forming the fibrous filter composite, the steps of the method including:

a) forming a first layer of glass fibers having random orientation, the layer being porous to gas flow therethrough, the first layer fibers having diameters between about 0.000050 and 0.000055 inch, b) and forming a porous mat and supporting said first layer of fibers at one side of the mat, the mat being of sufficient stiffness as to support the glass fiber layer during use as a filter, the mat comprising compacted glass fibers.

As will be seen, the fiber diameter range 0.000035 to 0.00015 inch corresponds to removal of between 95% and 45% of particulate of 1 micron size (i.e. between 95% and 45% efficiency).

In this regard, another objective and advantage of the invention lies in the fact that the composite construction of the filter media allows use of a more coarse fiber at the upper surface of the media, for any given particle removal efficiency. Thus, for any given efficiency, thirty to forty per cent more air is allowed to pass through the media at any given pressure. Resultant advantages include:

1) lower filter construction costs 2) longer filter life 3) less energy required for air systems.

The method also contemplates providing a porous means to be carried by the mat to block escape of glass fibers or particles from the filter composite during gas flow therethrough, and attaching the porous means to the mat at a location or locations at the opposite side of the mat.

These and other objects and advantages of the invention, as well as the details of an illustrative embodiment, will be more fully understood from the following specification and drawings, in which:

DRAWING DESCRIPTION

DETAILED DESCRIPTION

Figure 1:
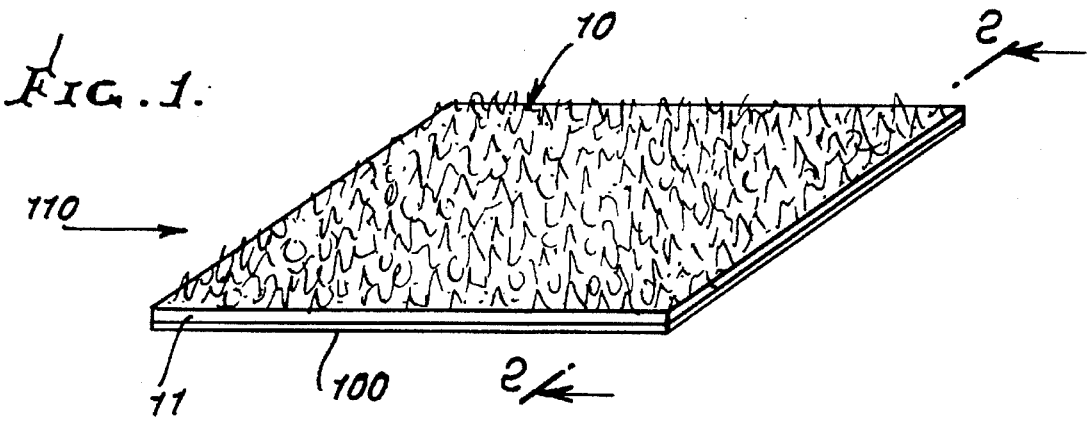
FIG. 1 is a perspective view of a composite filter embodying the invention.
Figure 2:
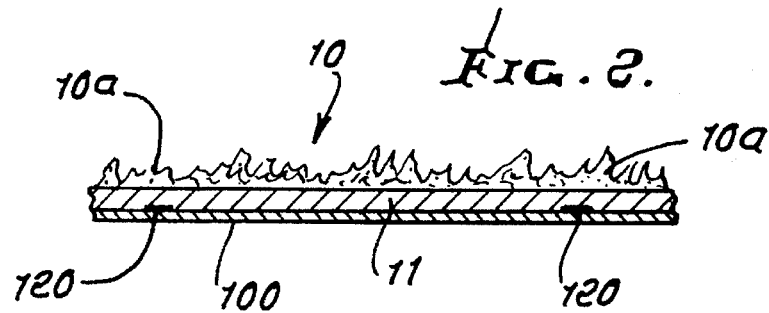
FIG. 2 is a section taken on lines 2—2 of FIG. 1.
Figure 6:
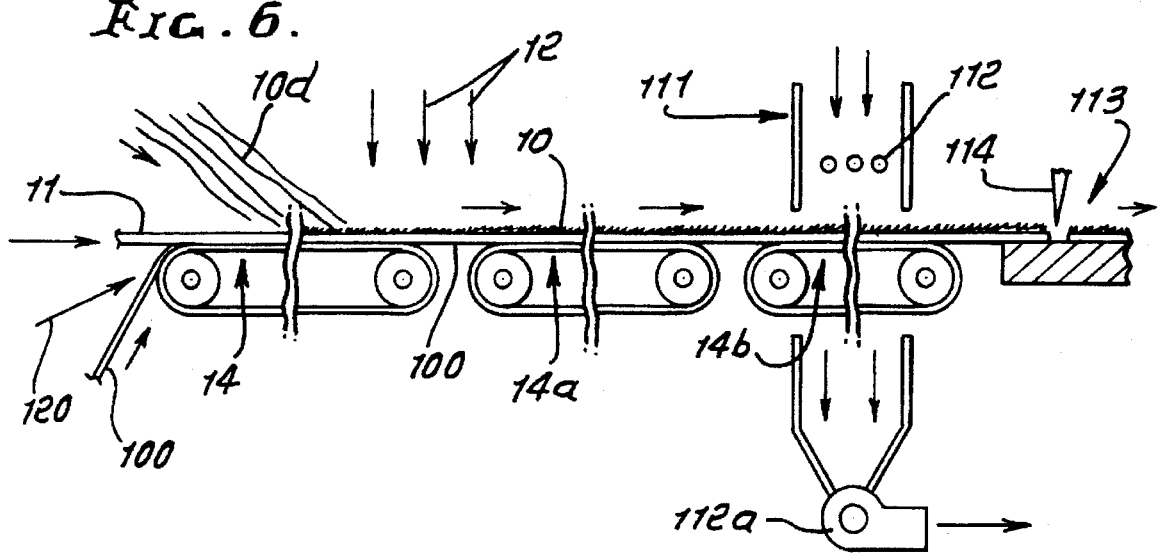
FIG. 6 is an elevation showing the method of forming the composite filter.
Figure 7:
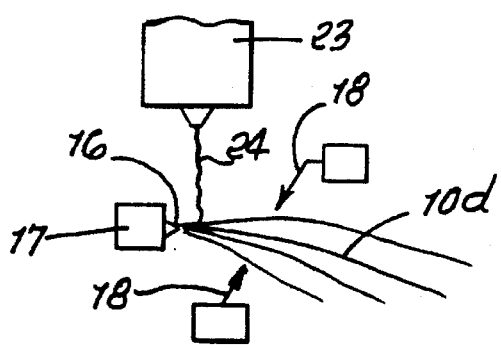
FIG. 7 is a view showing the formation of glass fibers; the disbursing of such fibers onto a mat in a first layer; and the attachment of the additional porous means to the underside of the mat.

Referring first to FIGS. 6 and 7, the method of forming the fibrous composite includes forming a first layer 10 of glass fibers (of random orientation) onto a non-woven glass fiber mat 11, in side-by-side relation, as in FIGS. 1 and 2; and passing gas, such as air, through 10 and 11 to effect good adherence of layer 10 to mat 11; and controlled reduction in overall thickness of the first layer, as for example to the resultant condition seen in FIGS. 1 and 2.

Arrows 12 indicate controlled flow of gas, such as air, through fibers, to reduce layer 11 to the indicated reduced thickness form as shown. Mat 11 was typically preformed to the compressed condition and thickness, as shown, the fibers therein bonded together by application of adhesive, such as synthetic resin to the fibers as they are formed, and laid down, and then compressed into relatively stiff sheet form, the resin then curing. The mat sheet is resiliently and yieldably bendable.

In addition, a thin, flexible layer 100 of porous material (as for example CEREX), is attached, as by porous adhesive bonding, to the underside of the mat 11 for containing (preventing escape of) very small diameter glass fibers in 10, which can tend to break. Layer 100 has a surface weight of between about 0.4 and 0.5 oz. per square yard, its thickness being between 0.001 and 0.005 inch. Conveyor 14 supports layer 100. CEREX is an air laid, NYLON, non-woven material made by Fiber Web.

First layer 10 typically has at least about 95% particulate retention capacity. In this regard, the sizing of the filter voids in layer 10 can be "tailored" to the particulate stream to be filtered, as by controlled compression of that layer 10 by the air or gas stream 12. The latter also aids in curing the bonding material applied to all the glass fibers dispersed to form·layer 10. Application of gas stream 12 can be continued until layer 10 attains desired overall thickness, due to controlled curing of the bonding material, i.e., synthetic resin holding the layer in somewhat compressed condition.

Tufts of fibers are desirably formed, as at 10a, seen in FIG. 2, to increase overall surface exposure of layer 10 to oncoming air flow to be filtered. See for example flow 125 in duct 120. The composite filter 110 is held in position by cardboard frame 91 receiving the filter edges 110b, the frame being held in position by the duct shoulders 126. Tufts 10a are presented upstream to the flow, and are randomly oriented and distributed, as seen.

It has been found that if the fibers in the first layer have diameters between 0.000050 and 0.000055 inch, 95% of particulate of one micron size is collected, the filter then presenting very low back pressure i.e. resistance to on-coming air or gas flow, in a duct. The achieved low pressure drop is about 0.50 to 0.55 per cent, whereas prior pressure drops were no lower than about 0.75 to 0.77 per cent, as in composites disclosed in application Ser. No. 08/209,920. As referred to above, however, the invention also contemplates use of fiber diameters between 0.000035 and 0.00015 inch corresponding to a range of about 95% to 45% efficiency. Referring to FIG. 7, a stream or streams 24 of molten glass are drawn downwardly from an orifice or orifices in a glass melt tank 23. Hot gas jets 16 produced by burners 17 melt the fiber or fibers to attenuate them into finer fibers displaced or blown rightwardly as shown at 10d. Those fibers travel rightwardly to deposit onto the mat 11. Binder is also dispersed at 18 onto or into the blown fibers to cause them to adhere to the mat and to one another, upon curing, in layer 10, described above. One useful binder consists of urea formaldehyde. That binder may also be used to bind layer 100 to the underside of the mat, as referred to.

FIG. 6 also shows passage of the formed composite 110 onto a second conveyor 14a for transfer to a third conveyor 14b. The composite 110 is cured and dried as it is conveyed by a porous belt 14b through an oven 111, wherein heater elements 112 heat air that passes downwardly through the porous composite to dry and cure same. A fan to produce air flow is indicated at 112a. The composite emerging from the oven is then transported to a cutting zone 113 wherein a cutter or cutters 114 cuts sections of the composite to desired length, the edges also being suitably trimmed by cutters.

Figure 6A:
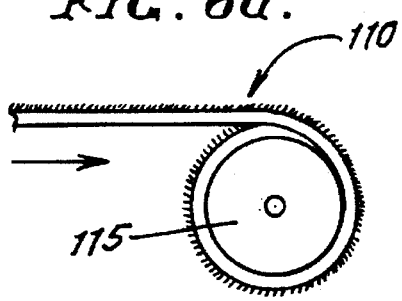
FIG. 6a is a schematic showing of roll-up of the finished filter on a drum or roller.

FIG. 6a shows roll-up of the composite 110 onto a drum or roller 115 for storage.

Figure 3:
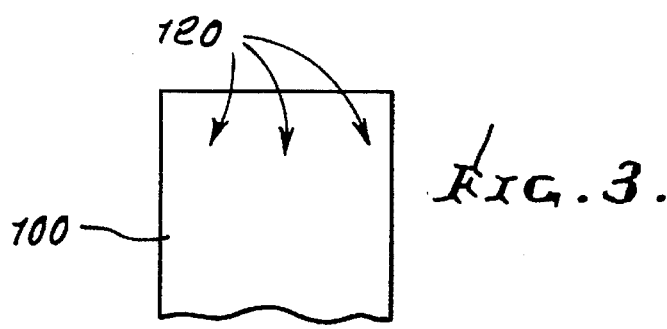
FIG. 3 is a plan view of the additional porous layer bonded to the underside of the mat and showing bond locations.
Figure 4:
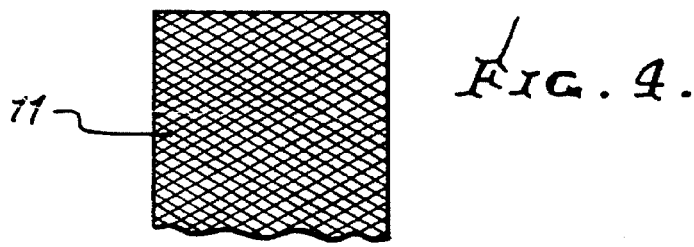
FIG. 4 is a plan view of the mat layer.

FIGS. 1 and 2 show the composite in greater detail with the first layer 10 of glass fibers adhered to the upper side of the mat 11. The porous additional layer 100 is shown adhered to the underside of the mat. Arrows 120 indicate distribution of binder onto the layer 100. See FIGS. 3 and 6.

The first layer 10 consists of glass fibers having random orientation, that layer being porous to gas flow therethrough. Tufts 11a project upwardly and provide greatly increased particle collection area during filter use.

As referred to, the porous mat 11 consists of non-woven glass fibers, which are previously compacted in the dense, flat layer form as shown, to have substantially less thickness than the first layer 10. The thickness of the mat is typically between 0.05 and 0.07 inches for best results, i.e., to provide wire-free support for the glass fiber layer 10, and to be yieldably and resiliently bendable, yet sufficiently stiff to be self-supporting and to support the layers 10 and 100. The binder-coated fibers of layer 10 adhere to the top surface of the mat during curing of the composite, whereby layer 10 is attached to the mat, yet porosity of the completed filter product is maintained.

As referred to, the additional layer 100 may be substantially thinner than the mat. The function of layer 100 is to collect glass fibers or particles, which may detach from layer 10 in use, so as to prevent their flow downstream. The adhesive or binder may consist of polyvinyl or other glue-type adhesive.

The composite filter is formed to have weight between 0.03 and 0.04 lbs. per square foot. Also, layer 10 is formed to have volumetric density of between 0.25 and 0.45 lbs. per cubic foot. The bulk of the weight of the composite is comprised of mat weight.

Figure 5:
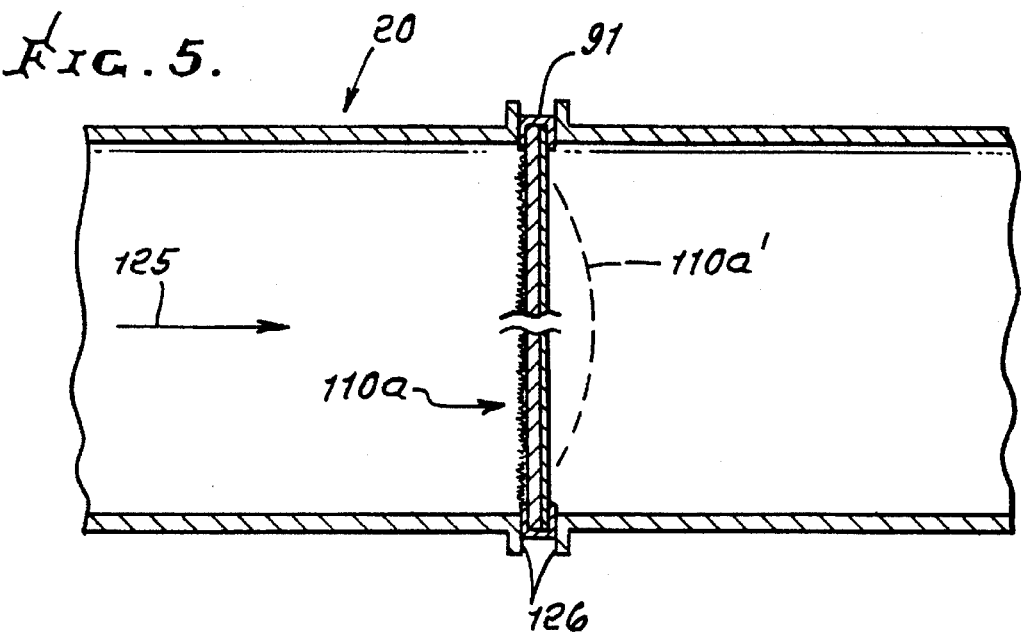
FIG. 5 shows the composite filter as it may be installed in a gas flow duct for collecting particulate in the gas flow.

In FIG. 5, the resultant composite filter 110a, typically rectangular in outline, is located in a duct 120. Edge portions of the composite are received in a rectangular cardboard frame 91, channel-shaped in cross section, as shown. The frame is retained between duct shoulders 126. The filter is resiliently and yieldably bendable, as to broken line position seen at 110a', in response to air or gas pressure exertion on its face. Changes in air pressure allow the filter to flex back and forth.

The nominal overall thickness of the composite filter is between 0.25 and 0.40 inches.

I claim:

1. In a filter composite, the combination comprising a) a first layer of glass fibers having random orientation, said layer being porous to gas flow therethrough, said first layer fibers having diameters between about 0.000035 and 0.00015 inch, and b) a porous mat of sufficient stiffness as to support said glass fiber layer during use as a filter, said mat consisting of compacted glass fibers.

2. The combination of claim 1 including:

c) an additional porous layer carried by the mat to block escape of glass fibers or particles from the filter composite during gas flow therethrough, said first layer and said additional layer being adhered to the mat at opposite sides thereof.

3. The combination of claim 1 including means supporting said filter composite in a gas flow duct with said first layer of glass fibers presented toward the oncoming flow.

4. The combination of claim 2 wherein said filter composite is free of wire support adjacent the composite within the duct.

5. The combination of claim 1 wherein said first layer of glass fibers has randomly distributed tufts projecting away from said mat to provide extended surface area for collection of particulate.

6. The combination of claim 4 wherein said first layer of glass fibers has randomly distributed tufts projecting away from said mat to provide extended surface area for collection of particulate.

7. The combination of claim 1 wherein said composite has overall thickness of between 0.25 and 0.40 inch.

8. The combination of claim 1 wherein said composite has weight between 0.03 and 0.04 lbs. per square foot.

9. The combination of claim 1 wherein said mat has sufficient thickness to be resiliently and yieldably bendable during gas flow impingement on said composite.

10. The combination of claim 2 wherein said additional porous layer consists essentially of non-woven, synthetic fiber.

11. The combination of claim 10 wherein said synthetic fiber consists of non-woven NYLON.

12. The combination of claim 1 wherein said mat consists essentially of non-woven, glass fibers.

13. The combination of claim 2 wherein said additional layer is bonded to said mat.

14. The combination of claim 2 wherein said additional layer and said first layer are bonded to opposite sides of the mat.

15. The combination of claim 3 wherein the first layer has fiber density characterized in that at least about 95% of all particulate of one micron size in said flow is collected, said first layer fibers having diameters between about 0.000050 and 0.000055 inch.

16. The combination of claim 1 wherein said first layer has density of between 0.25 and 0.45 lbs. per cubic foot.

17. In a fiber composite for use with a layer of glass fiber which is porous, and wherein said fibers have diameters between about 0.000035 and 0.00015 inch, the combination comprising:

a) a porous mat of sufficient stiffness as to support said glass fiber layer during use as a filter, said mat consisting of compacted glass fibers, and b) an additional porous layer carried by and adhered to the mat to block escape of glass fibers or particles from the filter composite during gas flow therethrough.

18. The combination of claim 17 wherein said additional layer consists of non-woven NYLON bonded to said mat.

19. In the method of forming a fibrous filter composite, the steps that include a) forming a first layer of glass fibers having random orientation, said layer being porous to gas flow therethrough, said first layer fibers having diameters between about 0.000035 and 0.00015 inch, b) forming a porous mat and supporting said first layer of fibers at one side of the mat, the mat being of sufficient stiffness as to support the glass fiber layer during use as a filter, the mat comprising compacted glass fibers.

20. The method of claim 19 including:

c) providing a porous means to be carried by the mat to block escape of glass fibers or particles from the filter composite during gas flow therethrough, d) and attaching said porous means to the mat at the opposite side thereof.

21. The method of claim 19 including forming said first layer of glass fibers to be randomly tufted to provide extended surface area, for collection of particulate.

22. The method of claim 19 including forming said composite to have overall thickness between 0.25 and 0.40 inch.

23. The method of claim 19 wherein said composite is formed to have weight between 0.03 and 0.04 lbs. per square foot.

24. The method of claim 19 wherein said mat is formed to have sufficient thickness to be resiliently and yieldably bendable during gas flow impingement on said composite.

25. The method of claim 19 including bonding said first layer and said additional layer to said mat at opposite sides thereof.

26. The method of claim 18 wherein said composite is adapted to be installed in a gas flow duct, and wherein the first layer has density characterized in that at least about 95% of all particulate of one micron size in said flow is collected.

27. The method of claim 19 wherein said first layer is formed to have density of between about 0.25 and 0.45 lbs. per cubic foot.

28. The method of claim 19 wherein said first layer is formed by withdrawing glass strands from a glass melt, to cool the strands, blowing gas into said strands to fracture the strands into fibers and to displace the fibers to deposit them on the mat, and dispersing binder into the displaced fibers, and bind fibers to the mat.

29. The method of claim 28 including providing and operating multiple conveyors to convey the composite through an oven for curing the composite, and then cutting the cured composite to filter size.

30. The method of claim 29 including mounting said cured composite in a duct wherein a gas stream is to be filtered, and allowing the composite to resiliently bend in the duct while the composite is self-supported only at edges thereof, in the duct.

31. The method of forming a filter that includes:

a) forming a mat consisting of non-woven glass fibers, and forming a tufted layer of glass fibers on the mat, said fibers in said tufted layer having diameters between about 0.000035 and 0.00015 inch.

b) and attaching a layer of porous material to a side of the mat, c) the overall thickness of the filter being less than about 0.40 inch.

32. The method of claim 31 including forming said tufted of glass fibers attached to the mat at a side thereof spaced from said layer of porous material.

33. The method of claim 31 wherein said forming of said tufted layer of glass fibers provides a density of glass fibers in said tufted layer characterized in that at least about 95% of all particulate of one micron size in said flow is collected, said fibers in said tufted layer having diameters between about 0.000050 and 0.000055 inch.

* * * * *